United States Patent
Shiina et al.

[11] Patent Number: 5,964,540
[45] Date of Patent: Oct. 12, 1999

[54] PRINTER APPARATUS

[75] Inventors: Tadashi Shiina, Yokohama; Tetsuo Suzuki, Kawasaki; Tetsuzo Mori, Hiratsuka; Kunitaka Ozawa, Isehara; Katsunori Hatanaka, Yokohama; Masakazu Ozawa, Ebina, all of Japan

[73] Assignee: Canon Kabushiki Kaisha, Tokyo, Japan

[21] Appl. No.: 08/488,417

[22] Filed: Jun. 7, 1995

Related U.S. Application Data

[63] Continuation of application No. 08/076,930, Jun. 16, 1993, abandoned, which is a continuation of application No. 07/751,634, Aug. 26, 1991, abandoned, which is a continuation of application No. 07/526,693, May 23, 1990, abandoned, which is a continuation of application No. 07/251,985, Sep. 29, 1988, abandoned, which is a continuation of application No. 06/946,912, Dec. 29, 1986, abandoned.

[30] Foreign Application Priority Data

| Dec. 28, 1985 | [JP] | Japan | 60-297551 |
| Dec. 28, 1985 | [JP] | Japan | 60-297552 |
| Dec. 28, 1985 | [JP] | Japan | 60-297553 |
| Dec. 28, 1985 | [JP] | Japan | 60-297554 |
| Dec. 28, 1985 | [JP] | Japan | 60-297555 |

[51] Int. Cl.$^6$ .................................................... B41J 3/54
[52] U.S. Cl. ...................... 400/149; 400/82; 400/124.04; 400/120.02
[58] Field of Search ............................ 347/117; 400/120, 400/121, 583.3, 240.4, 82, 124.02, 124.04, 120.02, 149, 279; 358/256, 257, 258, 296; 340/160, 157

[56] References Cited

U.S. PATENT DOCUMENTS

| 4,353,079 | 10/1982 | Kawanabe | 346/140 R |
| 4,467,348 | 8/1984 | Fujii et al. | 358/78 |
| 4,517,578 | 5/1985 | Tazaki | 346/140 R |
| 4,543,590 | 9/1985 | Tazaki et al. | 346/140 R |
| 4,562,485 | 12/1985 | Maeshima | 358/280 |
| 4,658,300 | 4/1987 | Kawamura et al. | 358/280 |
| 4,660,077 | 4/1987 | Kawamura et al. | 358/75 |
| 4,673,972 | 6/1987 | Yokomizo | 358/75 X |
| 4,675,696 | 6/1987 | Suzuki | 358/296 X |
| 4,721,968 | 1/1988 | Arai et al. | 346/136 |

FOREIGN PATENT DOCUMENTS

| 50-159923 | 12/1975 | Japan | 400/120.01 |
| 54-74436 | 6/1979 | Japan | 400/279 |
| 55-164169 | 12/1980 | Japan | 347/117 |
| 163685 | 9/1983 | Japan | 400/53 |
| 173675 | 10/1983 | Japan | 400/126 |
| 226564 | 12/1984 | Japan | 400/126 |
| 59-230768 | 12/1984 | Japan | 400/120.02 |
| 60-11116 | 1/1985 | Japan | 400/120.01 |
| 59-163971 | 9/1994 | Japan | 400/120.01 |

*Primary Examiner*—John Hilten
*Attorney, Agent, or Firm*—Fitzpatrick, Cella, Harper & Scinto

[57] ABSTRACT

A recording apparatus having a memory for storing recording data, and an address counter for controlling addresses in the memory in the direction of the columns or rows. The address counter controls a read start address for starting a process of reading the memory, thereby compensating for deviations in the longitudinal or widthwise direction of recording paper.

22 Claims, 11 Drawing Sheets

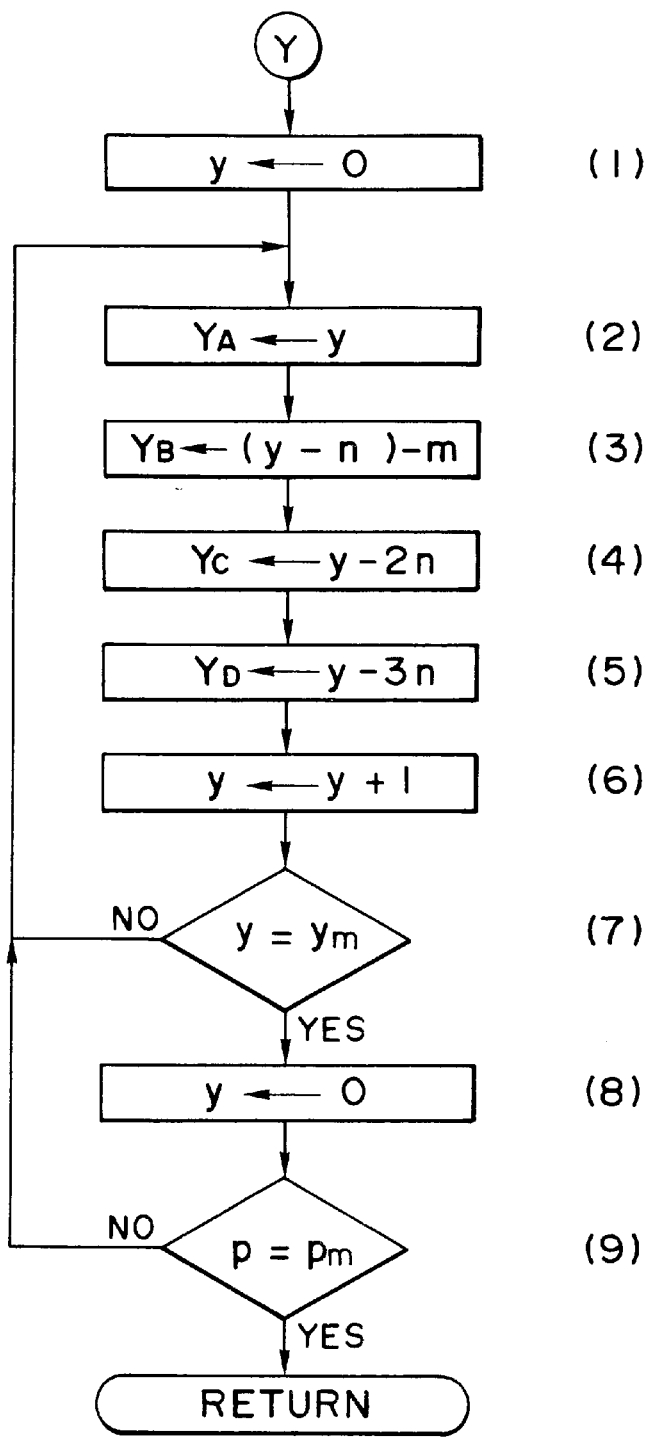

FIG.10
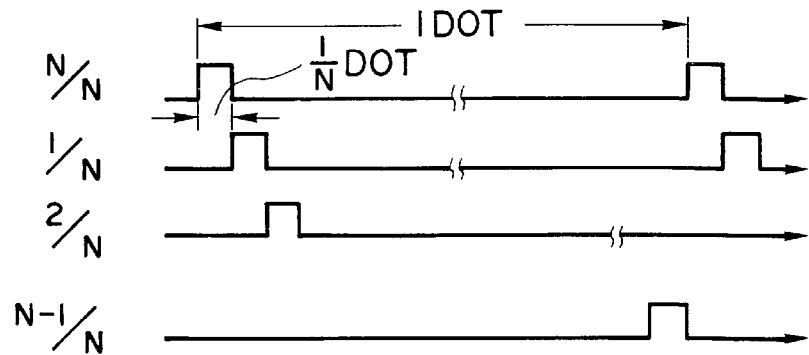
FIG.11A
FIG.11B
FIG.11C
FIG.11D
FIG.11E
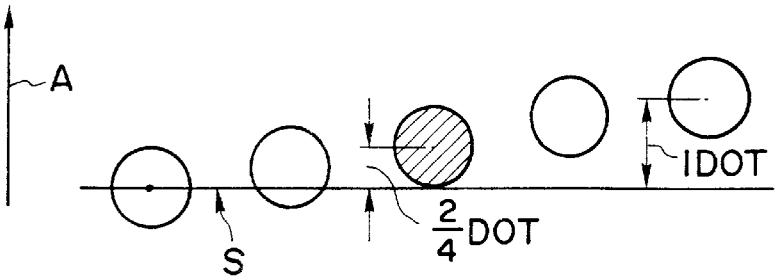

PRINTER APPARATUS

This application is a continuation of application Ser. No. 08/076,930 filed Jun. 16, 1993 which was a continuation of application Ser. No. 07/751,634, filed Aug. 26. 1991, which was a continuation of application Ser. No. 07/526,693, filed May 23, 1990, which was a continuation of application Ser. No. 07/251,985, filed Sep. 29, 1988, which was a continuation of application Ser. No. 06/946,912, filed Dec. 29, 1986, all now abandoned.

BACKGROUND OF THE INVENTION

1. Field of the Invention

This invention relates to a printer apparatus.

2. Related Background Art

A known type of fully-multiple recording head employed in a color printer has line heads units 1A, 1B, 1C and 1D for applying four colors: Yellow, Magenta, Cyan, Black, which are disposed in that order with the unit 1A in the lower most position in the direction of paper supply, as shown in FIG. 1. A sheet of recording paper 2 is transferred over this recording head (a head assembly having head units) in the direction indicated by the arrow A in FIG. 1 to perform recording.

TOF marks 3 are disposed on the sheet of recording paper 2 at predetermined intervals. The position from which recording of batch of data corresponding to each page of recording paper is commenced is set on the basis of each TOF mark 3. The TOF marks 3 are detected by a TOF sensor 4 (only one position of a TOF photosensor is exemplified in FIG. 1) which is disposed under the head assembly. Recording is started from each predetermined position marked on the recording paper 2 when the TOF mark 3 is detected by the TOF sensor 4.

If there is some error in the placement of the TOF sensor 4 relative to the recording head as shown in FIG. 2, namely, a deviation δ from the normal position S in the direction of paper supply (the same would be true in the reverse direction) during the recording of color images or color graphs which are displayed on a monitor screen such as CRT are recorded, this deviation causes a TOF deviation.

The TOF deviation results in a deviation of the position of an image recorded on the recording paper 2. Therefore, such deviations must be minimized.

Also, any mechanical deviation in the longitudinal. direction of the recording paper from the standard position of the head unit, e.g., a deviation in the longitudinal direction of the recording paper, causes a deviation of color registration, or the spatial relationship between the desired image on the recording medium and a color image actually recorded thereon in the longitudinal direction.

Similarly, a mechanical deviation in the transverse direction of the recording paper from the standard position S of each head unit, e.g., a widthwise deviation, causes a widthwise deviation of registration.

If one or more of the head elements 1A to 1D (one or more) moves out of the standard positions and there are amounts of mechanical misalignment relative to these standard positions, these amounts of misalignment also cause misalignment of the registration.

It has been difficult for the conventional method to reduce the TOF deviation or deviations in the longitudinal or widthwise direction of the recording paper to adjust the head alignment.

It has also been difficult for a new head assembly (recording heads or head units) to be suitably adjusted with respect to the TOF deviation, deviations in the longitudinal or widthwise direction of the recording paper, and the head alignment at the time of replacement of the head assembly.

SUMMARY OF THE INVENTION

Therefore, an object of the present invention is to provide a printer apparatus free from the above-described defects.

Another object of the present invention is to provide a printer apparatus capable of accurately setting the top of an image.

Still another object of the present invention is to provide a printer apparatus capable of optionally adjusting the top of an image of a print.

A further object of the present invention is to provide a printer apparatus capable of improving registration of a print in the longitudinal direction of the recording paper.

A still further object of the present invention is to provide a printer apparatus capable of improving color registration.

A still further object of the present invention is to provide a printer apparatus capable of improving widthwise registration of a print.

A still further object of the present invention is to provide a printer apparatus capable of easily adjusting head alignment.

BRIEF DESCRIPTION OF THE DRAWINGS

FIG. 9 is a flowchart of the memory address control shown in FIG. 8;

FIG. 10 is a diagram of head drive timing;

FIGS. 11A to 11E are timing diagrams of the head drive;

DESCRIPTION OF THE PREFERRED EMBODIMENTS

Figure 1:
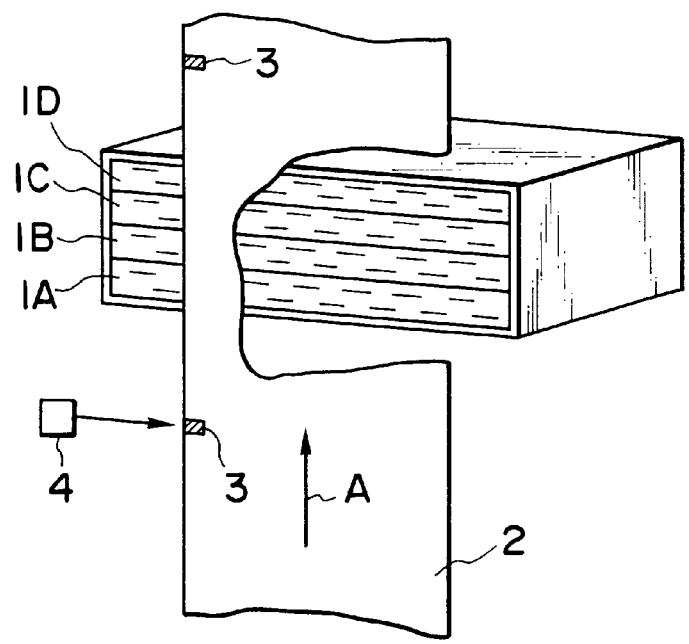
FIG. 1 is a schematic perspective illustration of an example of a full-multiple recording head of a printer.
Figure 2:
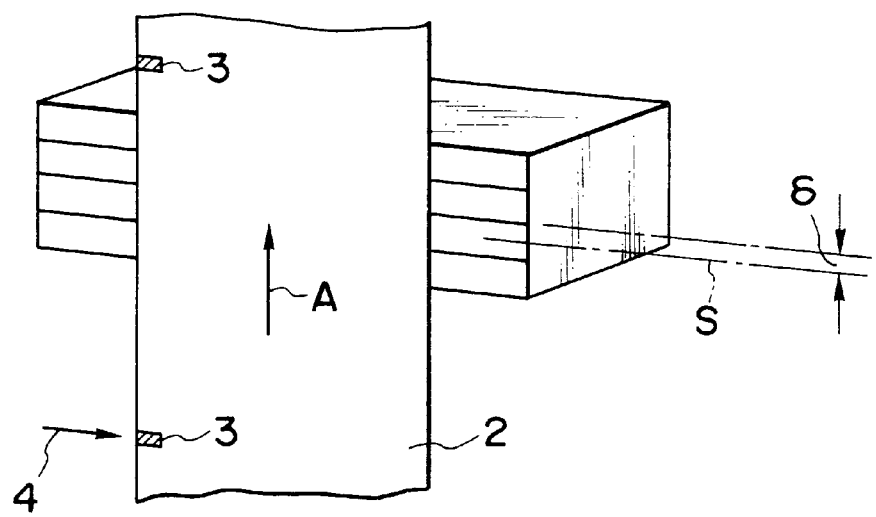
FIG. 2 is a schematic illustration of a deviation between a TOF sensor and a recording head of the printer shown in FIG. 1.
Figure 3:
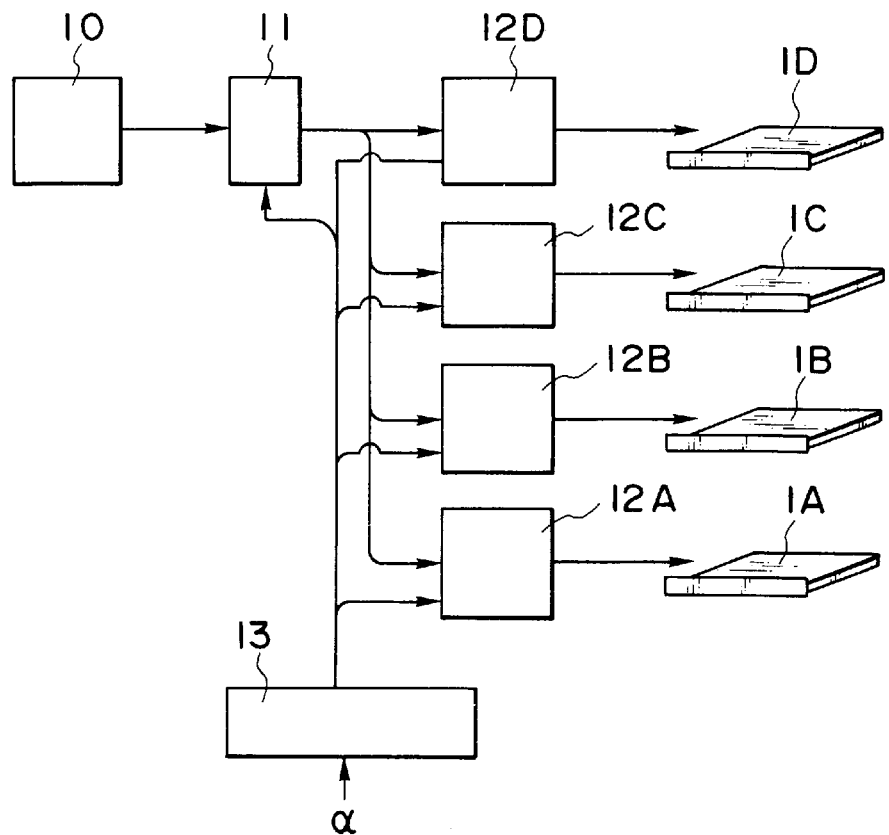
FIG. 3 is a block diagram of a control system suitable for use in an embodiment of the present invention.

FIG. 3 shows a block diagram of a control system for a printer.

As shown in FIG. 3, data supplied from a host computer 10 is separated by a switching unit (MUX) 11 into items of color data each representing colors: Yellow, Magenta, Cyan and Black and is transmitted in a switching manner to data memories (RAM) 12A, 12B, 12C and 12D for storing each color data.

Each memory has a capacity for storing items of color data which corresponds to one page of recording paper.

Items of data which have been stored in the data memories 12A to 12D are supplied to the corresponding head units 1A to 1D, and the head units are driven on the basis of the data supplied, thereby performing the required recording.

A control unit 13 controls the operation of switching unit 11 and the operations of writing data into the data memories 12A to 12D and reading out data from these memories to the head units 1A to 1D.

The control unit 13 has a write memory address counter and a read address counter. The write memory address counter controls the switching unit 11 such that the items of color data corresponding to one page are switched and transmitted to be successively stored in the data memories 12A to 12D.

Figure 4:
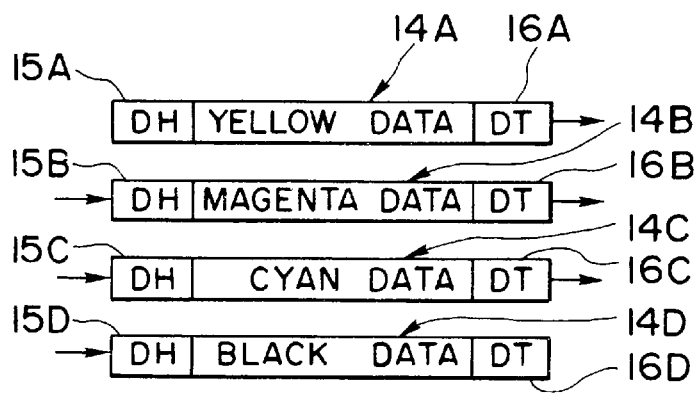
FIG. 4 is a diagram of examples of data supplied from a host computer of the system shown in FIG. 3.

FIG. 4 shows the constitution of items of data for one line corresponding to the width of the recording paper and supplied from the host computer 10. These items of data include items of color data: Yellow data 14A, Magenta data 14B, Cyan data 14C, and Black data 14D. These items of data are supplied from the host computer 10 in the order reverse to that of the recording effected by the head units (the order of reading out data from the data memories). That is, Black data 14D is first supplied and written into the data memory.

Data headers (DH) 15A, 15B, 15C and 15D and data terminators (DT) 16A, 16B, 16C and 16D are placed in front of and at the rear of the items of color data. These data headers and data terminators are employed in the process of widthwise registration adjustment which is described later.

According to the present invention, when the items of color data which have been stored in the data memories 12A to 12D are transmitted to the corresponding head units 1A to 1D, this read process is controlled such that the read start address is shifted to an extent which corresponds to the deviation between the TOF sensor 4 and the recording head (head assembly), thereby adjusting TOF.

Figure 5:
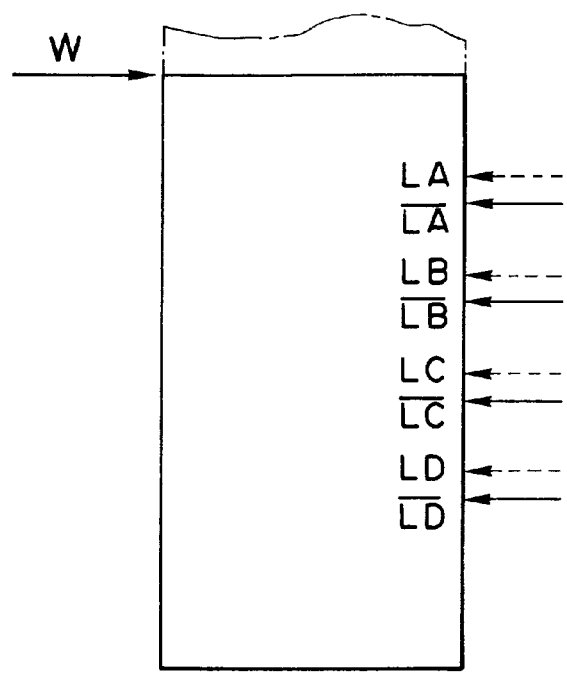
FIG. 5 is an illustration of states of data read positions adjusted in a data memory in accordance with the present invention.

FIG. 5 shows the relationship between the write position (entrances) W of the items of color data and the standard read-out positions (standard addresses) LA, LB, LC and LD of the items of Yellow, Magenta, Cyan and Black data in the data memories (RAM) corresponding to these colors.

In the memory 12B, LB represents the standard read-out position relative to the write position. The read start address W is the same in all memories 12A to 12D.

The adjustable range is within ±32 lines, and the adjusting pitch is a quarter of a line. This process is effected by inputting an item of adjustment data $\alpha$ into the control unit 13 which controls the read address counter for reading each memory in the direction of the columns. This counter counts signals indicating lines in the memory to forward the read of the memory in the direction of the columns while determining the initial value of this count and the read address with respect to each memory.

An example of this process will be described below with respect to a case in which the recording, head is shifted from the normal position to the extent corresponding to four dots in the direction of paper supply.

In this case, the read start address of each data memory is corrected by being shifted to the extent corresponding to four dots in the direction of the position of the item of data which has been written earlier, and the read process is controlled such that the read-out position of each group of items of color data is shifted from the corresponding one of standard positions LA to LD to the positions $\overline{LA}$, $\overline{LB}$, $\overline{LC}$ and LD to the extent corresponding to four dots in the direction of the position of the item of data which is to be read later, as shown in FIG. 5.

The read start address in each data memory is controlled in accordance with the deviation of the recording head, thereby adjusting TOF easily and accurately.

The read of the memory with this address is commenced at a time $t_1$ when a predetermined number of paper supply pulses (shown in FIG. 6) is counted after the detection of the TOF mark.

Figure 7:
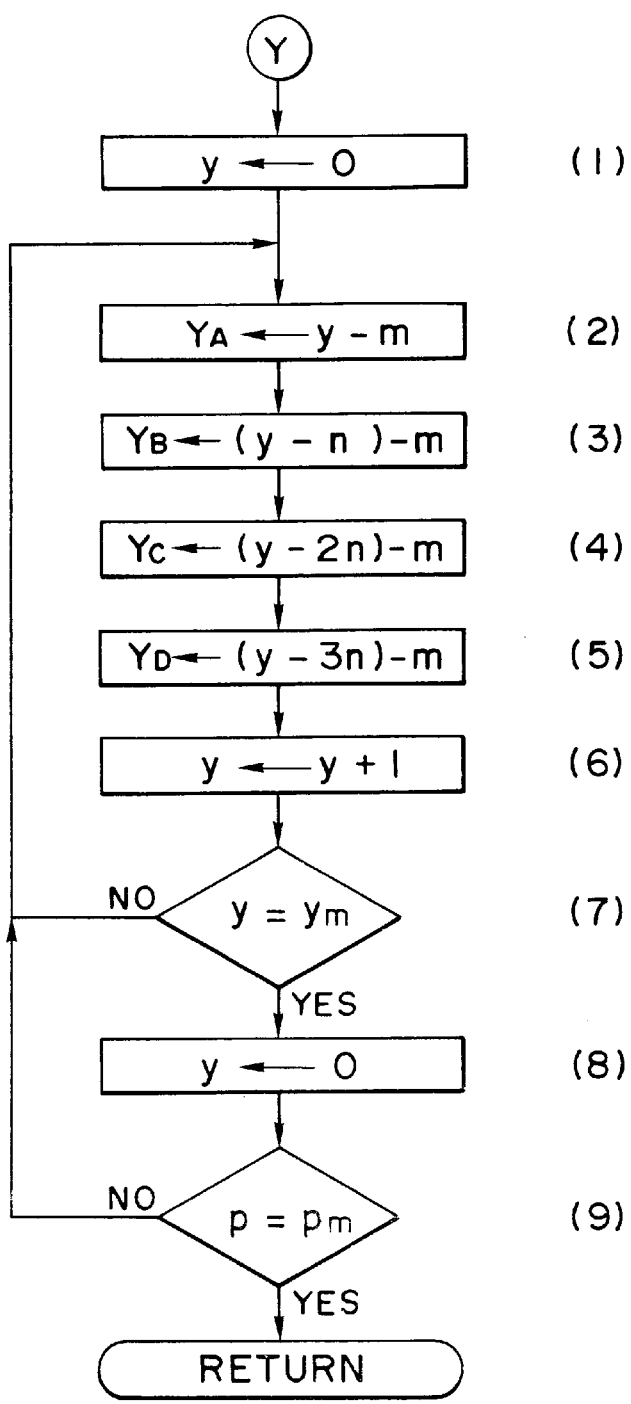
FIG. 7 is a flowchart of the memory address control shown in FIG. 5.

FIG. 7 shows the program of a process of reading each memory which is effected by the read address counter of the control unit 13. Since the deviation $\delta$ of the head assembly corresponds to four dots (four lines), m is set to be 4. If each of the intervals between the heads 1A to 1D corresponds to n lines, a read address YA of the memory 12A at a moment is set to be y-4; an address YB of the memory 12B, y-n-4; an address YC of the memory 12C, y-2n-4; and an address YD of the memory 12D, y-3n-4. Accordingly, at the time $t_1$ (y=0) when the read process is commenced, the addresses YA to YD are -4, -n-4, -2n-4 and -3n-4 to that no data is output. The read steps are effected every line and the read process proceeds in the y direction (the direction of paper supply). After it has proceeded for four lines, in other words, when y becomes four in Step 6, the addresses YA to YD are accessed at 0, -n, -2n, and -3n. If there is some data with the address represented by YA=0, the data is supplied to the yellow head, thereby starting print of yellow. The read process further proceeds while the recording paper is being supplied. After it has proceeded for n lines, YB=0 (in Step 3). If there is data with this address, the data is supplied to the Magenta head, thereby starting print of Magenta. Similarly, the read addresses of the memories 12C and 12D successively change into YC=0, YD=0, and the output of the corresponding color data for the same line relative to the position of each head is successively started. After the read process has proceeded from the time $t_1$ to the time when the recording paper advances for 3n+4 (=y) lines, the addresses YA to YD become 3n, 2n, n and 0, respectively, and the color line data with each address is output at that time. Each time the read of the memories for one line is completed, the process is repeated from Step 2 in synchronized relationship with the paper supply. When the number of lines amounts to ym for one page (in Step 7), the count value y of the address counter is reset to be zero (in Step 8), and (in Step 9) judgment is made as to whether or not the next page is to be printed. If the present page is not the last page, the process is continued and repeated from Step 2 until the print of the last page is completed. The part of the process from Step 2 to the last Step is carried out in the manner of program interrupt in response to a paper supply pulse given after the time $t_1$ or to the line data DH supplied from the memory.

In another example of the embodiment, the adjustment of TOF may be effected by changing the count of the pulses synchronized with the paper supply from the detection of TOF and starting recording from a time $t_1$ based on the number of pulses counted which differs in relation to the deviation of the recording head units.

Figure 6:
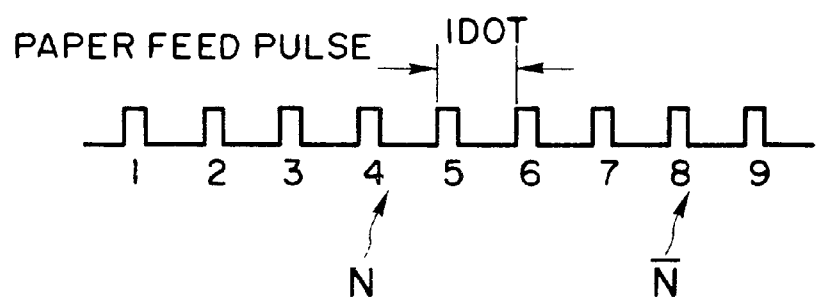
FIG. 6 is an illustration of the number of paper supply pulses adjusted in another embodiment of the present invention.

The paper supply pulses are composed of pulse signals supplied at regular intervals corresponding to one dot, as shown in FIG. 6.

When the recording head is shifted from the normal position in the direction of paper supply to the extent corresponding to four dots and when the standard count value N for designating the start of recording is set to be four, this count value is corrected for four dots, and the recording is controlled to start at a count value of N=8, thereby realizing the same effect and, hence, the same TOF adjustment as in the case of the above-described data read process in which the read start address is controlled. In this case, the accessing process effected by the address counter is expressed by setting m in FIG. 7 to be zero.

Figure 8A:
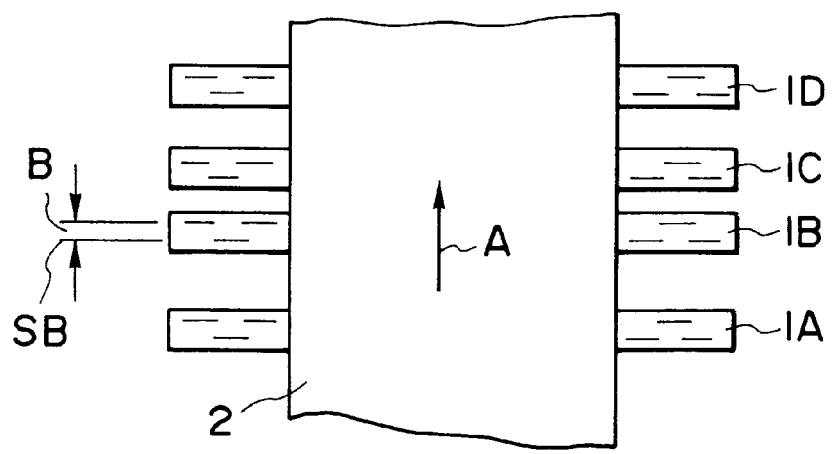
FIG. 8A is an illustration of an example of deviation of a head unit in the longitudinal direction relative to a sheet of recording paper.
Figure 8B:
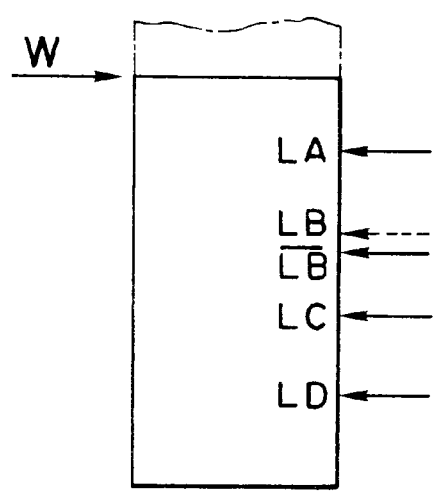
FIG. 8B is an illustration of a corresponding state of address control.

FIG. 8 shows an example of a process of adjusting registration in the longitudinal direction of the recording paper. When the items of color data which have been stored in the data memories (RAM) 12A to 12D are supplied to the head units 1A to 1D, a vertical deviation of each of the head units 1A to 1D is compensated to adjust registration in the longitudinal direction by controlling the data read address of the memory which corresponds to the head unit deviated in the longitudinal direction of the recording paper. The adjustable range is within ±32 lines, and the adjusting pitch is a quarter of a line. This process is effected by inputting an item of adjustment data α into the control unit 13 which controls the read address counter for reading each memory in the direction of the columns. This counter counts signals indicating lines in the memory to forward the read of the memory in the direction of the columns while determining the initial value of this count.

It is assumed that, as shown in FIG. 5, the head unit 1B for Magenta is shifted from the standard position SB in the direction of the head unit 1C for Cyan (upward) to a deviation δB in the longitudinal direction of the recording paper corresponding to four dots.

The data to be supplied from the data memory 13B for Magenta data to the head unit 1B is supplied from the position LB which is shifted from the read-out position LB, from which the data is read out when there is no deviation in the longitudinal direction of the recording paper, to the extent corresponding to four dots in the direction of the position of the item of data which is to be written earlier. That is, the read address is corrected for the dots corresponding to the deviation in the longitudinal direction of the recording paper.

FIG. 9 shows the program of a process of addressing the read of each memory. This program is similar to that shown in FIG. 7. Since in this case only the head unit 1B is shifted for four dots (m=4), the read address YB of the memory 12B is y-n-4. The other three addresses YA, YC and YD are y, y-2n, and y-3n. The address number in each memory is increased in a manner similar to that in the above-described case, as shown in FIG. 7, thereby effecting color print with color registration correctly aligned.

FIGS. 10 and 11 show another example of the process of adjusting the registration in the longitudinal direction of the recording paper. The items of data which have been stored in the data memories 12A and 12D are supplied to the corresponding head units 1A to 1D which are driven on the basis of these items of data. In this case, each head unit can be adjusted and driven on the basis of a drive timing which is staggered in a step manner by a period of time which is obtained by dividing the driving period for printing through one line by an integral number N, as shown in FIG. 10. That is, when the print process which employs one head unit is commenced on the basis of a line synchronizing signal, this synchronizing signal is shifted by 1/N a cycle in a step manner, thereby compensating a head deviation.

This process of adjusting registration in the longitudinal direction of the recording paper will be described below with reference to FIG. 11 with respect to a case in which only the head unit 1B for Magenta is deviated in the longitudinal direction of the recording paper.

It is assumed here that the above integral number N is four; the drive timing is staggered by a period of time corresponding to a quarter of the diameter of a dot; and the head unit 1B for Magenta is shifted by two quarters of (half of) the dot diameter from the standard position (indicated by SB in FIG. 8) in the direction of the head unit 1C for Cyan (the direction of paper supply).

In this case, the other three head units which exhibit deviations in the longitudinal direction of the recording paper are driven on the basis of a standard timing such as shown in FIG. 11A (the interval of pulses is equal to that of dots). On the other hand, the head unit 1B for Magenta which is deviated by two quarters of the dot diameter in the direction of paper supply is driven on the basis of a timing delayed from the standard timing by a period of time corresponding to two quarters of the dot diameter, as shown in FIG. 11B.

While the drive timing for driving the head unit 1B deviated in the longitudinal direction of the recording paper is being shifted in this manner, the dot recording position on the recording paper is shifted in the direction of paper supply (the direction indicated by the arrow A) by two quarters of the dot diameter relative to the standard position S, thereby adjusting registration in the longitudinal direction of the recording paper as shown in FIG. 11E.

FIG. 11C shows a timing chart of a drive timing used when one of the head units exhibits a deviation in the longitudinal direction of the recording paper which corresponds to a quarter of the dot diameter, and FIG. 11D shows a timing chart of a drive timing used when one of the head units exhibits a deviation in the longitudinal direction which corresponds to three quarters of the dot diameter. These timings are shown in relation to the timings shown in FIGS. 11A and 11B.

In the embodiment described above, the drive timing for driving each of the head units 1A to 1D can be shifted by a period of time corresponding to 1/N the dot diameter in accordance with a deviation of the head unit in the longitudinal direction of the recording paper. Therefore, it is possible for registration to be adjusted accurately in a simple manner in the longitudinal direction of the recording paper, thereby reducing the problems of dispersions of the head (or head units) due to the manufacturing process and deviations in the longitudinal direction of the recording paper caused when the head is replaced.

Since the head can be controlled by being shifted by 1/N the dot diameter at a time, it is possible to compensate for deviations in the longitudinal direction of the recording paper with a desired degree of accuracy.

The above-described embodiment and another embodiment described below employ recording heads composed of four head units, but the present invention is applicable irrespective of the number of head units. It is also possible to compensate for deviations not only in the direction of paper supply as shown in the drawings but also in the reverse direction.

FIGS. 12 to 15 show an example of a process of adjusting widthwise registration. As described above with reference to FIG. 4, data headers DH 15A, 15B, 15C and 15D and data terminators DT 16A, 16B, 16C and 16D are placed in front of and at the rear of items of data 14A to 14D. These data headers and data terminators are codes for adjusting widthwise registration and include items of informations for compensating for widthwise deviations of head units. The printer recognizes data involving these codes DH and DT.

Figure 12:
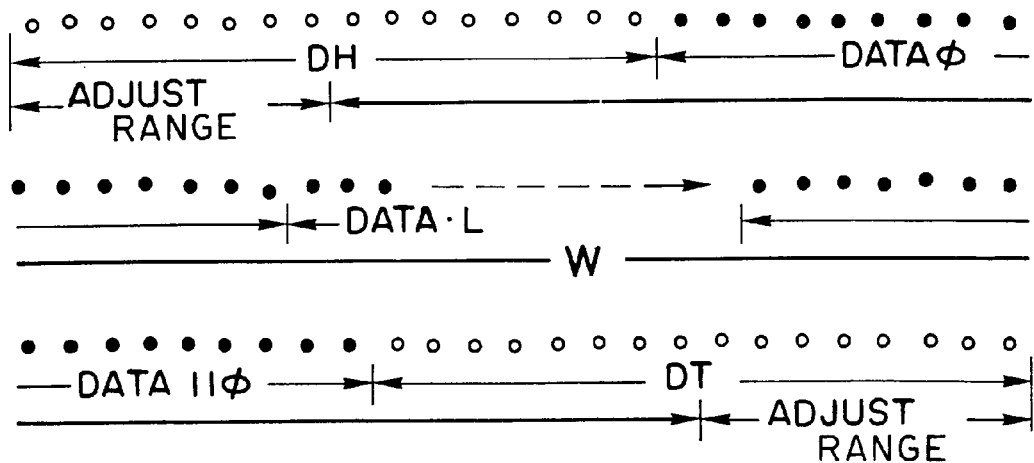
FIG. 12 is an illustration of a composition of the data of FIG. 4.

FIG. 12 illustrates the bit pattern of color data supplied from the host computer 10, namely, one of the items of data 14A to 14D shown in FIG. 4.

As shown in FIG. 12, each item of data includes items of image data dATA0 to dATA110 and a 16-bit data header and a 16-bit data terminator respectively disposed at the front and rear end of the item of data, thereby forming a recording range W for one line involving halves of the bits of data header and terminator. Adjust ranges are formed at the front and rear ends, that is, within the regions defined by the remaining 8-bit data header and terminator.

Figure 13A:
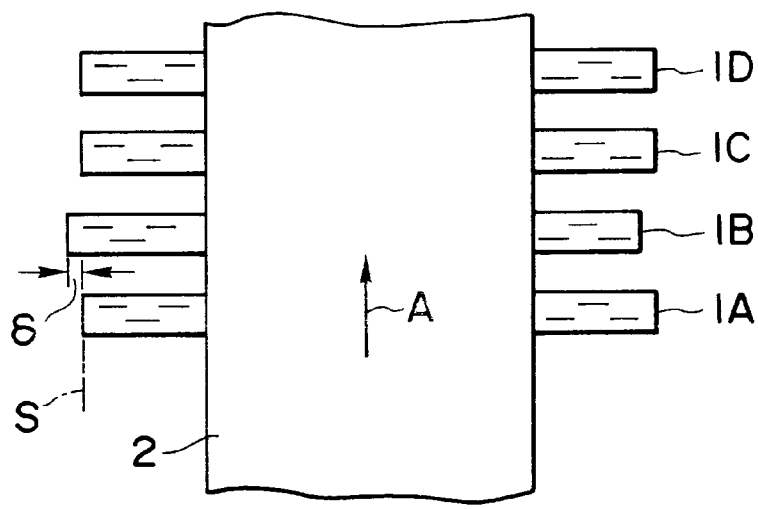
FIGS. 13A to 13C are schematic illustrations of widthwise deviation of a head unit relative to other units and the states of items of data adjusted with respect to this widthwise deviation.
Figure 13B:
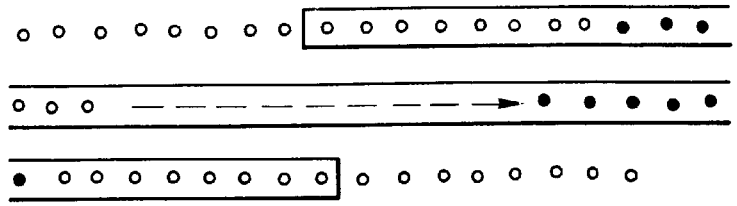
Figure 13C:
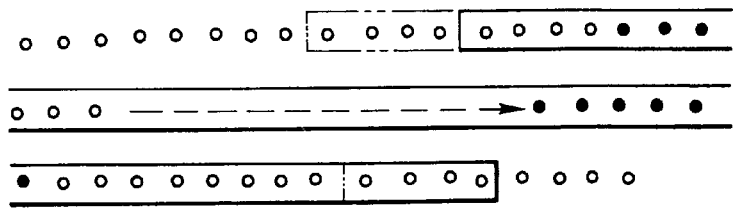

As shown in FIG. 13A, the recording paper 2 is transferred in the direction indicated by the arrow A over the four head units 1A to 1D for printing Yellow, Magenta, Cyan and Black disposed in the direction of paper supply. FIGS. 13B and 13C show the data read-out positions (data supply positions) of the items of data in the color data memories 12A to 12D from which the items of data are supplied to the head units 1A to 1D.

As described above, items of data such as shown in FIG. 4 supplied from the host computer 10 are classified by the switching unit 11 shown in FIG. 3 into items of color data respectively representing Yellow, Magenta, Cyan and Black and are stored in the corresponding data memories 12A to 12D. These items of data are thereafter read from the data memories and supplied to the head units 1A to 1D, thereby performing recording.

In this example of a process of adjusting width-wise registration, while the items of color data stored in the data memories 12A to 12D are being supplied to the head units 1A to 1D, a widthwise deviation of each head unit is compensated by adjusting the data read-out position in the corresponding data memory.

It is assumed here that, as shown in FIG. 13A, the head unit 1B for Magenta is deviated leftward from the standard position S to an extent corresponding to four dots (an amount of widthwise deviation δ) and the other three head units are not deviated.

In this case, the items of data of Yellow, Cyan and Black to be supplied to the head units which are not deviated are transmitted from the standard read-out positions in the data memories to the corresponding head units to occupy the same from the right end, as shown in FIG. 13B. On the other hand, the item of Magenta data to be supplied to the head unit which is deviated leftward to the extent corresponding to four dots is transmitted from the position in the data memory 12 which is shifted, as shown in FIG. 13C, from the standard read-out position in the direction of the data terminator to the extent corresponding to four dots, and is supplied to the corresponding head unit 1B to occupy the same from the right end. This process is effected by determining the initial address in the address counter for reading the memory 12B in the direction of the rows.

It is thus possible to adjust widthwise registration patterns by compensating for the deviation of the head unit 1B.

In another example of the process of adjusting widthwise registration in accordance with the present invention, a widthwise deviation of each of the head units 1A to 1D is compensated by controlling the data write position in corresponding one of the data memories 12A to 12D.

It is assumed that the head unit 1B for Magenta is deviated leftward from the standard position S to an extent corresponding to four pixels (an amount of widthwise deviation δ) and the other three head units are not deviated, as is similar to the case shown in FIG. 13A.

Figure 14A:
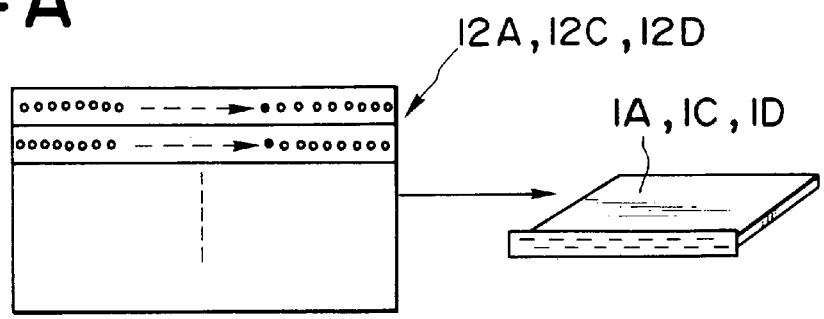
FIGS. 14A and 14B are schematic illustrations of write positions in the data memory with respect to the state shown in FIG. 13.
Figure 14B:
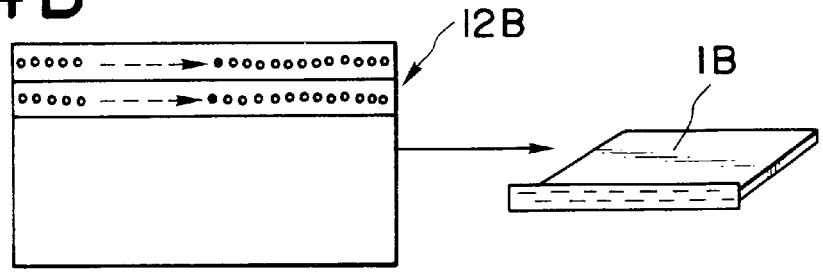

In this case, the items of data of Yellow, Cyan and Black to be supplied to the head units which are not deviated are written from the standard write positions in the corresponding data memories, as shown in FIG. 14(A). On the other hand, the item of Magenta data to be supplied to the head unit which is deviated leftward to the extent corresponding to four pixels is written from the position in the data memory 12B which is shifted from the standard write position to the extent corresponding to four pixels, as shown in FIG. 14B.

When the write position in each data memory is controlled in this manner, it is not necessary to adjust the output position (read-out position) from which the data is transmitted to corresponding one of the head units 1A to 1D. The data is transmitted from the same address of the memory. It is thereby possible to effect the widthwise registration adjustment with respect to the deviated head unit. The effect of this method is similar to that of the above-described method of controlling the read-out position.

Figure 15:
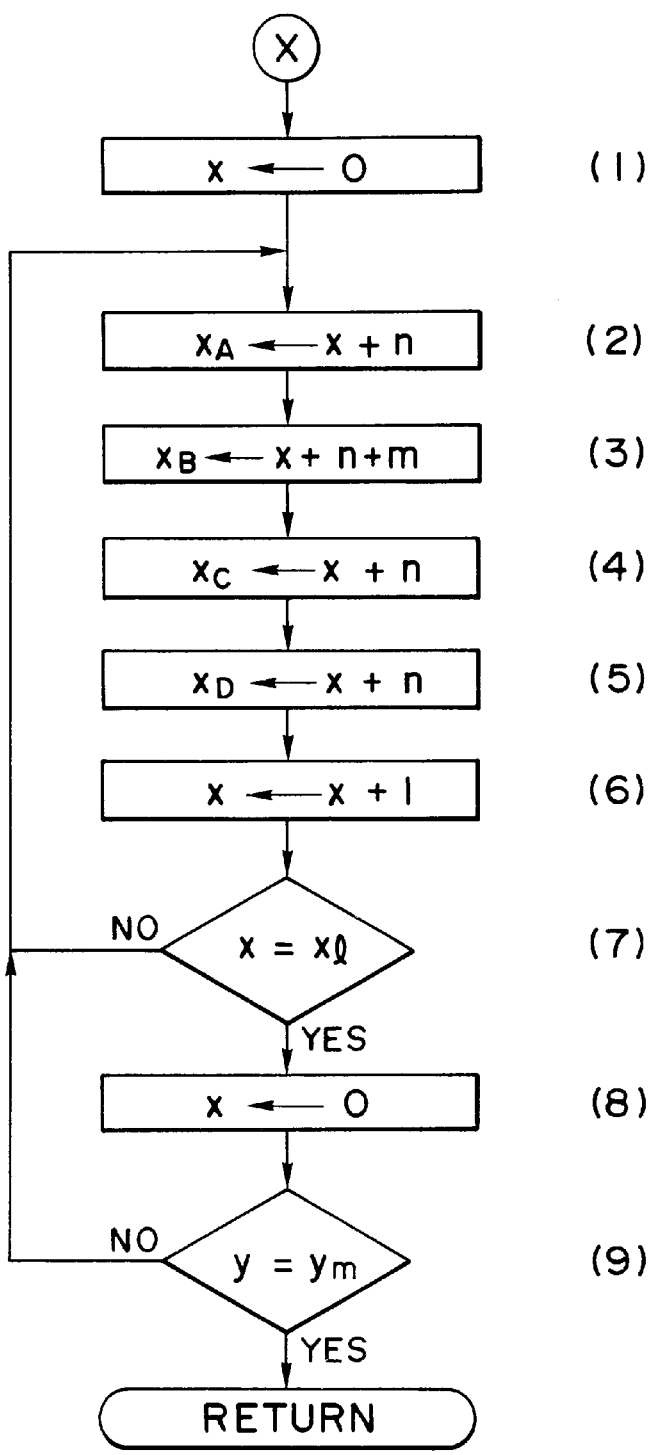
FIG. 15 is a flowchart of the memory address control with respect to the state shown in FIG. 13.

FIG. 15 shows the program of a process of addressing data and reading each memory in the direction of the rows which is effected by the control unit 13. The standard read address which is employed when there in no widthwise deviation is set to be XA-XD: n with respect to each memory. In this example, n=8. The head unit 1B is deviated to an extent corresponding to m dots, so that XB=12 when m=4. Each time the read process proceeds for one dot, the address number is increased (Step 6). These steps are repeated until the read of the number of dots $x_l$ corresponding to one line is completed. When these steps are completed, the read of the next line in the direction of the rows is commenced from x=0 (Step 8). The process is continued from Step 9 until the read for one page is completed. The part of the process from Step 2 to the last Step shown in FIG. 15 is carried out in the manner of program interrupt in synchronized relationship with the picture element clock.

The present invention will be described below with respect to the process of adjusting head alignment.

Figure 16A:
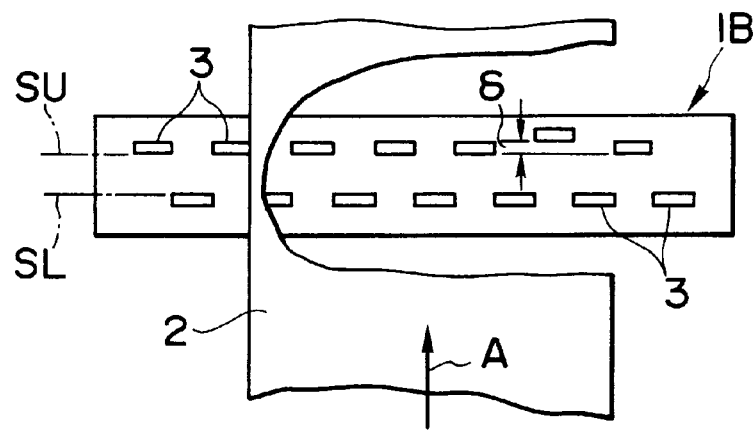
FIG. 16A is a schematic illustration of misalignment of a head element relative to a sheet of recording paper.
Figure 16B:
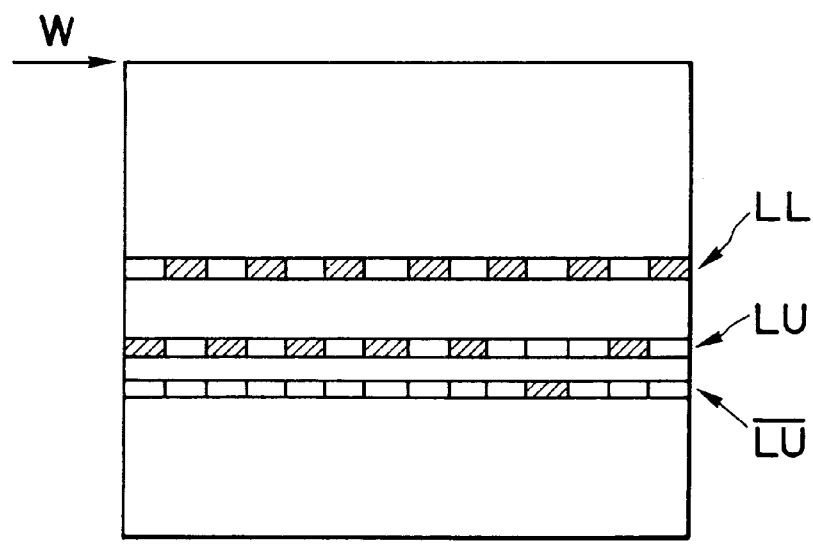
FIG. 16B is a schematic illustration of read addresses in the data memory adjusted in accordance with the present invention in relation to this misalignment.

FIG. 16A shows the recording paper 2 and one of the head units 1A, 1B, 1C and 1D for Yellow, Magenta, Cyan and Black disposed in the direction of paper supply in this order with the unit 1A in the lowermost position, that is, in this case, the Magenta head unit 1B, the recording paper 2 being transferred in the direction indicated by the arrow A over head elements 3 of the Magenta head unit 1B. FIG. 16B shows the relationship between the data write position W and the standard data read positions LL for the lower row of head elements 3 and the standard data read positions LU for the upper row of head elements 3. The write start address W is the same in all the memories 12A to 12D.

When the items of color data which have been stored in the data memories (RAM) 12A to 12D are supplied to the head elements 3 of the corresponding head units 1A to 1D, the data read addresses for the head elements 3 of at least one of the head units 1A to 1D which are misaligned are controlled in accordance with the state of this misalignment to compensate for the misalignment of the head elements 3.

It is assumed here that, as shown in FIG. 16A, one of the head element 3 which is located in the upper row and which is sixth counted from the left is upwardly misaligned relative to the standard position S to an amount of misalignment δ corresponding to two dots.

In this case, as shown in FIG. 16B, one of the items of data for the magenta head unit 1B which is to be transmitted to the head element 3 which exhibits the misalignment δ is transmitted from the position LU which is shifted from the standard read position SU to the extent corresponding to two dots in the direction of the position of the items of data which have been written earlier (in the direction reverse to the read-out order). It is thereby possible to compensate for the amount of misalignment δ of the head element 3.

An item of adjustment data α is input into the control unit 13, and the memory read control in the transverse direction of the recording paper is effected in response to this input by controlling the address counter for reading the memory in the direction of rows so as to compensate for the misalignment in the transverse direction and by controlling the address counter for reading the memory in the direction of the columns so as to compensate for the misalignment in the longitudinal direction.

These examples of the adjustment processes can be adapted for use in various types of recording apparatus (printers or facsimile apparatus) irrespective to recording methods such as ink-jet thermal print.

In the above-described example, it is also possible to select the amount of adjustment with respect to the address control, etc., to select a desirable reproducing position.

What is claimed is:

1. A color recording apparatus comprising:
    a plurality of recording heads, including first to fourth recording heads, for recording a color image on a sheet, said color image having a plurality of color components, wherein each said recording head records at a different record position;
    a plurality of memory means for storing image data corresponding to respective said color components, said plural memory means being prepared for respective said plural recording heads;
    input means for inputting a control data according to an amount of displacement in an arrangement direction regarding each of said recording heads, said input means serving to input the control data independently for each of the plural recording heads;
    address signal generating means for generating an address signal for read-out of said image data, for each of said plural memory means, said address signal generating means comprising control means for controlling a read-out address of image data of corresponding said memory means based on the control data inputted from said input means; and
    drive/control means for driving/controlling said plural recording heads, in accordance with image data read out from each of said plural memory means based on the address signal for each of said plural memory means generated from said address signal generating means.

2. A color recording apparatus according to claim 1, wherein each said recording means performs a recording operation by placing lines across the sheet in a widthwise direction, and said control means is adapted to start reading data from a different address of each said memory based on the position of said recording means, the address corresponding to a line.

3. A color recording apparatus according to claim 1, wherein said control means is capable of adjusting the starting address for reading data from each said memory.

4. A color recording apparatus according to claim 1, wherein said control means is capable of adjusting the starting address for reading data from one of said memories.

5. A color recording apparatus according to claims 1, wherein each said memory is capable of storing at least one page of image data.

6. A color recording apparatus according to claim 1, wherein each said recording means comprises a head unit having a size corresponding to the width of the sheet.

7. A color recording apparatus according to claim 1, wherein the number of said recording means corresponds to the number of color components in the color image to be recorded.

8. A color recording apparatus according to claim 1, wherein said recording means comprise ink-jet head units.

9. A color recording apparatus according to claim 1, wherein each said recording means performs a recording operation by placing lines across the sheet in a widthwise direction, and said control means is adapted to adjust the starting address corresponding to the position of a recording means in a line direction when recording data is read from said memory corresponding to said recording means.

10. A color recording apparatus according to claim 1, wherein the color components of the image to be recorded are yellow, magenta, cyan and black components.

11. A color recording apparatus comprising:
    a plurality of recording heads, including first to fourth recording heads, for recording on a sheet a color image having a plurality of color components, each said recording head having a recording element disposed in a predetermined direction, said plural recording heads being arranged in a different direction from the predetermined direction;
    a plurality of memory means for storing image data corresponding to respective said color components, said plural memory means being prepared for respective said plural recording heads;
    input means for inputting a control data according to an amount of displacement in the predetermined direction regarding each of said recording heads, said input means serving to input the control data independently for each of the plural recording heads;
    address signal generating means for generating an address signal for read-out or writing of image data, for each of said plural memory means, said address signal generating means comprising control means for controlling a read-out address or writing address of image data of corresponding said memory means based on the control data inputted from said input means; and
    drive/control means for driving/controlling said plural recording heads in accordance with image data read out from said plural memory means.

12. A color recording apparatus according to claim 11, wherein each said recording means performs a recording operation by placing lines across the sheet in a widthwise direction, and said control means is adapted to start reading data from a different address of each said memory based on the position of said recording means, the address corresponding to a line.

13. A color recording apparatus according to claim 11, wherein said control means is capable of adjusting the starting address for reading data from each said memory.

14. A color recording apparatus according to claim 11, wherein said control means is capable of adjusting the starting address for reading data from one of said memories.

15. A color recording apparatus according to claims 11, wherein each said memory is capable of storing at least one page of image data.

16. A color recording apparatus according to claim 11, wherein each said recording means comprises a head unit having a size corresponding to the width of the sheet.

17. A color recording apparatus according to claim 11, wherein the number of said recording means corresponds to the number of color components in the color image to be recorded.

18. A color recording apparatus according to claim 11, wherein said recording means comprise ink-jet head units.

19. A color recording apparatus according to claim 11, wherein each said recording means performs a recording operation by placing lines across the sheet in a widthwise direction, and said control means is adapted to adjust the starting address corresponding to the position of a recording means in a line direction when recording data is read from said memory corresponding to said recording means.

20. A color recording apparatus according to claim 11, wherein the color components of the image to be recorded are yellow, magenta, cyan and black components.

21. A control method for a printer provided with a plurality of recording heads, including first to fourth recording heads, each of said recording heads having a plurality of recording elements arranged in a predetermined direction, said recording heads being arranged in a direction different from the predetermined direction, said recording heads being driven according to image data while conveying a recording material in an arrangement direction of said recording heads, said method comprising the steps of:

causing input means to allow input of a control data according to an amount of displacement in the predetermined direction between said recording heads, for all the recording heads, said input means serving to input the control data independently for each of all the recording heads; and controlling a read-out position/writing position of the image data from/into each of image data storing means provided correspondingly to respective ones of the plural recording heads, in accordance with the control data inputted from said input means, whereby the displacement in the predetermined direction regarding the plural recording heads is controlled.

22. A control method for a printer provided with a plurality of recording heads, including first to fourth recording heads, each of said recording heads having a plurality of recording elements arranged in a predetermined direction, said recording heads being arranged in a direction different from the predetermined direction, said recording heads being driven according to image data while conveying a recording material in an arrangement direction of said recording heads, said method comprising the steps of:

causing input means to allow input of a control data according to an amount of displacement in the direction different from the predetermined direction between said recording heads, for all the recording heads, said input means serving to input the control data independently for each of all the recording heads; and controlling either a read-out position of the image data from each of image data storing means provided correspondingly to respective ones of all the recording heads or a writing start timing of the image data of said recording heads, in accordance with the control data inputted from said input means, whereby the displacement in the direction different from the predetermined direction regarding all the recording heads is adjusted.

* * * * *

UNITED STATES PATENT AND TRADEMARK OFFICE
CERTIFICATE OF CORRECTION

PATENT NO.   :  5,964,540

DATED        :  October 12, 1999

INVENTORS    :  TADASHI SHIINA, et al.

It is certified that error appears in the above-identified patent and that said Letters Patent is hereby corrected as shown below:

On the title page, item [56]:

<u>REFERENCES CITED</u>:

U.S. PATENT DOCUMENTS, insert --5,517,578  5/85  Tazaki--.

FOREIGN PATENT DOCUMENTS, "59-163971  9/1994  Japan" should read --59-163971  9/1984  Japan--.

<u>COLUMN 4</u>:

Line 8, "recording" should read "recording,--.

<u>COLUMN 7</u>:

Line 14, "informations" should read --information--.

Signed and Sealed this

Twenty-seventh Day of March, 2001

Attest:

NICHOLAS P. GODICI

Attesting Officer

Acting Director of the United States Patent and Trademark Office